US009588746B2

(12) United States Patent
Gschwind et al.

(10) Patent No.: US 9,588,746 B2
(45) Date of Patent: *Mar. 7, 2017

(54) COMPILER METHOD FOR GENERATING INSTRUCTIONS FOR VECTOR OPERATIONS ON A MULTI-ENDIAN PROCESSOR

(71) Applicant: International Business Machines Corporation, Armonk, NY (US)

(72) Inventors: Michael Karl Gschwind, Chappaqua, NY (US); Jin Song Ji, Ponte Vedra, FL (US); William J. Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/576,391

(22) Filed: Dec. 19, 2014

(65) Prior Publication Data

US 2016/0179524 A1  Jun. 23, 2016

(51) Int. Cl.
*G06F 9/45* (2006.01)
*G06F 9/30* (2006.01)

(52) U.S. Cl.
CPC ............ *G06F 8/41* (2013.01); *G06F 9/30036* (2013.01); *G06F 9/30145* (2013.01)

(58) Field of Classification Search
None
See application file for complete search history.

(56) References Cited

U.S. PATENT DOCUMENTS 5,560,009 A   9/1996  Lenkov et al.
5,721,924 A   2/1998  Kitadate
(Continued)

FOREIGN PATENT DOCUMENTS

GB   002409067 B   12/2006
WO   2007103195 A2   9/2007
WO   2010029794 A1   3/2010

OTHER PUBLICATIONS

Rajamohan, Srijith, "A Neural Network Based Classifier on the Cell Broadband Engine", The Pennsylvania State University, Aug. 2009.
Bailey et al., "Processor-Centric Design: Processors, Multi-Processors, and Software", Chapter 6 of ESL Models and their Applications, Embedded Systems, 2010.
(Continued)

*Primary Examiner* — Qamrun Nahar
(74) *Attorney, Agent, or Firm* — Martin & Associates, LLC; Derek P. Martin

(57) ABSTRACT

A compiler includes a vector instruction processing mechanism that generates instructions for vector instructions in a way that assures correct operation in a bi-endian environment, wherein the processor architecture contains instructions with an inherent endian bias. The compiler uses a code generation endian preference that is specified by the user, and that determines a natural element order. When the compiler processes a computer program, it generates instructions for vector operations by determining whether the vector instruction has an endian bias that matches the specified endian preference (i.e., the inherent element order of the vector instruction matches the natural element order). When the vector instruction has no endian bias, or when the endian bias of the vector instruction matches the specified endian preference, the compiler generates one or more instructions for the vector instruction as it normally does. When the endian bias of the vector instruction does not match the specified endian preference, the compiler generates instructions to fix the mismatch.

10 Claims, 6 Drawing Sheets

(56) References Cited

U.S. PATENT DOCUMENTS

| | | | |
|---|---|---|---|
| 5,828,884 A * | 10/1998 | Lee ..................... | G06F 7/768 703/26 |
| 5,881,288 A | 3/1999 | Sumi et al. | |
| 5,968,164 A | 10/1999 | Loen et al. | |
| 5,987,248 A | 11/1999 | Murayama et al. | |
| 5,996,057 A | 11/1999 | Scales, III et al. | |
| 6,065,106 A | 5/2000 | Deao et al. | |
| 6,351,750 B1 | 2/2002 | Duga et al. | |
| 7,552,427 B2 | 6/2009 | Adiletta et al. | |
| 7,600,155 B1 | 10/2009 | Nickolls et al. | |
| 7,716,642 B1 | 5/2010 | Michael et al. | |
| 8,010,953 B2 | 8/2011 | Gschwind | |
| 8,108,846 B2 | 1/2012 | Gschwind | |
| 8,255,886 B2 | 8/2012 | Lachner | |
| 8,255,891 B2 | 8/2012 | Chen et al. | |
| 8,458,681 B1 | 6/2013 | Coutant et al. | |
| 8,566,645 B2 | 10/2013 | Rentschler et al. | |
| 8,725,990 B1 | 5/2014 | Karandikar et al. | |
| 9,256,505 B2 | 2/2016 | Chakravarty | |
| 2001/0049763 A1 | 12/2001 | Barry et al. | |
| 2002/0199173 A1 | 12/2002 | Bowen | |
| 2003/0182650 A1 | 9/2003 | Smith | |
| 2004/0158819 A1 | 8/2004 | Cuomo et al. | |
| 2004/0221268 A1 | 11/2004 | Nichols et al. | |
| 2004/0221274 A1 | 11/2004 | Bross et al. | |
| 2004/0221276 A1 | 11/2004 | Raj | |
| 2004/0268094 A1 | 12/2004 | Abdallah et al. | |
| 2005/0066146 A1 | 3/2005 | Barry et al. | |
| 2005/0125647 A1 | 6/2005 | Symes et al. | |
| 2006/0125663 A1 | 6/2006 | Adiletta et al. | |
| 2006/0243787 A1 | 11/2006 | Dravnieks et al. | |
| 2007/0226469 A1 * | 9/2007 | Wilson ............ | G06F 7/768 712/225 |
| 2008/0098376 A1 | 4/2008 | Fulton et al. | |
| 2008/0288930 A1 | 11/2008 | Chen et al. | |
| 2009/0089547 A1 | 4/2009 | Moyer | |
| 2009/0198977 A1 | 8/2009 | Gschwind et al. | |
| 2010/0042815 A1 | 2/2010 | Gonion et al. | |
| 2010/0058302 A1 | 3/2010 | Broscaru et al. | |
| 2011/0154303 A1 | 6/2011 | Rice et al. | |
| 2011/0209003 A1 | 8/2011 | Matsukawa | |
| 2011/0271259 A1 | 11/2011 | Moench et al. | |
| 2012/0030652 A1 | 2/2012 | Jelinek | |
| 2012/0060016 A1 | 3/2012 | Eichenberger et al. | |
| 2012/0185836 A1 | 7/2012 | Loenko | |
| 2013/0247010 A1 | 9/2013 | Bradbury et al. | |
| 2013/0263092 A1 | 10/2013 | Chikahisa et al. | |
| 2014/0019506 A1 | 1/2014 | Kuo | |
| 2014/0196013 A1 | 7/2014 | Orr et al. | |
| 2014/0201450 A1 | 7/2014 | Haugen | |
| 2014/0298336 A1 | 10/2014 | Taniuchi | |
| 2015/0095626 A1 | 4/2015 | Nakagawa et al. | |
| 2015/0106793 A1 | 4/2015 | Kahne et al. | |
| 2015/0169294 A1 | 6/2015 | Brock et al. | |
| 2015/0186232 A1 | 7/2015 | Conner et al. | |
| 2015/0261636 A1 | 9/2015 | Chakravarty | |
| 2015/0277880 A1 | 10/2015 | Gschwind et al. | |
| 2015/0331783 A1 | 11/2015 | Blackman et al. | |
| 2016/0217197 A1 | 7/2016 | Rachlin | |

OTHER PUBLICATIONS

Brevnov et al., "Writing a Bi-Endian Compiler", Dr. Dobb's, The World of Software Development, Jul. 2, 2012.

Burger et al., The SimpleScalar tool set, version 2.0., [Online] 1997, ACM SIGARCH Computer Architecture News 25.3 (1997), [Retrieved from the Internet] <http://dx.doi.org/10.1145/268806.268810> pp. 13-25.

Watson et al., The architecture of a parallel relative debugger, [Online] 2000, Proceedings of the 13th International Conference on Parallel and Distributed Computer Systems. 2000, [Retrieved from the Internet] <http://citeseerx.ist.psu.edu/viewdoc/download-?doi=10.1.1.444. 7514&rep=rep1 &type=pdf> 8 pages total.

Ren, Gang, "Compiling Vector Programs for SIMD Devices", Dissertation, University of Illinois at Urbana-Champaign, 2006, retrieved from the Internet: <URL:https://www.ideals.illinois.edu/handle/2142/11226>, p. 1-152.

Gschwind et al., "Compiler Optimizations for Vector Instructions" U.S. Appl. No. 14/576,942, filed Dec. 19, 2014.

Gschwind et al., "Compiler Optimizations for Vector Instructions" U.S. Appl. No. 14/584,385, filed Dec. 29, 2014.

Gschwind et al., "Compiler Method for Generating Instructions for Vector Operations on a Multi-Endian Processor" U.S. Appl. No. 14/583,674, filed Dec. 27, 2014.

Gschwind et al., "Compiler Method for Generating Instructions for Vector Operations in a Multi-Endian Instruction Set" U.S. Appl. No. 14/576,710, filed Dec. 19, 2014.

Gschwind et al., "Compiler Method for Generating Instructions for Vector Operations in a Multi-Endian Instruction Set" U.S. Appl. No. 14/583,691, filed Dec. 27, 2014.

Gschwind et al., "Compiler Optimizations for Vector Operations That Are Reformatting-Resistant" U.S. Appl. No. 14/827,639, filed Aug. 17, 2015.

Gschwind et al., "Compiler Optimizations for Vector Operations That Are Reformatting-Resistant" U.S. Appl. No. 14/840,695, filed Aug. 31, 2015.

Gschwind et al., "Debugger Display of Vector Register Contents After Compiler Optimizations for Vector Instructions" U.S. Appl. No. 14/845,967, filed Sep. 4, 2015.

Gschwind et al., "Debugger Display of Vector Register Contents After Compiler Optimizations for Vector Instructions" U.S. Appl. No. 14/850,652, filed Sep. 10, 2015.

List of IBM Patents or Patent Applications Treated As Related.

Rohou et al., "Vectorization Technologn to Improve Interpreter Performance", ACM Transactions on Architecture and Code Optimization, vol. 9, No. 4, Article 26, Jan. 2013.

Ziantz, LH. et al.; "Run-time optimization of sparse matrix-vector multiplication on SIMD machines"; PARLE '94. Parallel Architectures and Languages Europe. 6th International PARLE Conference Proceedings, pp. 313-322, 1994.

Software Patent Institute et al.; "Measuring User Programs for a SIMD Processor"; an IP.com Prior Art Database Technical Disclosure; http://ip.com/IPCOM/000150988; Apr. 19, 2007.

Software Patent Institute et al.; "Compiling Ordinary Programs for Execution on an Asynchronous Multiprocessor"; an IP.com Prior Art Database Technical Disclosure; http://ip.com/IPCOM/000148160; Apr. 12, 2007.

* cited by examiner vector unsigned char a = { 0, 1, 2, 3, 4, 5, 6, 7, 8, 9, 10, 11, 12, 13, 14, 15 };
vector unsigned char b = vec_splat(a,3);   — 810
FIG. 8
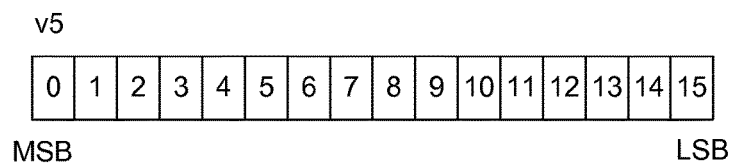
MSB                                                                 LSB
FIG. 9
vspltb v5, 3
FIG. 10
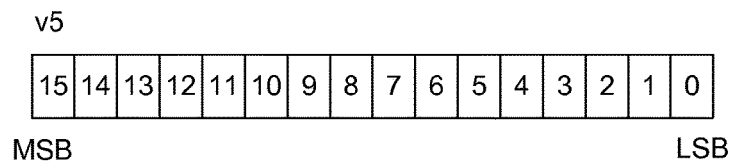
MSB                                                                 LSB
FIG. 11
vspltb v5, 12
FIG. 12

COMPILER METHOD FOR GENERATING INSTRUCTIONS FOR VECTOR OPERATIONS ON A MULTI-ENDIAN PROCESSOR

This patent application is related to U.S. Ser. No. 14/576,710 filed on Dec. 19, 2014 entitled "COMPILER METHOD FOR GENERATING INSTRUCTIONS FOR VECTOR OPERATIONS IN A MULTI-ENDIAN INSTRUCTION SET" and is also related to U.S. Ser. No. 14/576,942 filed on Dec. 19, 2014 entitled "COMPILER OPTIMIZATIONS FOR VECTOR INSTRUCTIONS", both of which are incorporated herein by reference.

BACKGROUND

1. Technical Field

This disclosure generally relates to computer systems, and more specifically relates to compilers that generate code for computer systems.

2. Background Art

Computer systems have evolved into extremely sophisticated devices, and computer systems may be found in many different settings. Dramatic advances in both hardware and software (e.g., computer programs) have drastically improved the performance of computer systems. Modern software has become very complex when compared to early computer programs. Many modern computer programs have tens or hundreds of thousands of instructions. The execution time (and hence, performance) of a computer program is very closely related to the number and complexity of instructions that are executed as the computer program runs. Thus, as the size and complexity of computer programs increase, the execution time of the computer program increases as well.

Unlike early computer programs, modern computer programs are typically written in a high-level language that is easy to understand by a human programmer. Special software tools known as compilers take the human-readable form of a computer program, known as "source code", and convert it into "machine code" or "object code" instructions that may be executed by a computer system. Because a compiler generates the stream of machine code instructions that are eventually executed on a computer system, the manner in which the compiler converts the source code to object code affects the execution time of the computer program.

The execution time of a computer program, especially complex computer programs, is a function of the arrangement and type of instructions within the computer program. The way compilers generate instructions thus significantly affects the run-time performance of the code generated by the compiler.

BRIEF SUMMARY

A compiler includes a vector instruction processing mechanism that generates instructions for vector instructions in a way that assures correct operation in a bi-endian environment, wherein the processor architecture contains instructions with an inherent endian bias. The compiler uses a code generation endian preference that is specified by the user, and that determines a natural element order. When the compiler processes a computer program, it generates instructions for vector operations by determining whether the vector instruction has an endian bias that matches the specified endian preference (i.e., the inherent element order of the vector instruction matches the natural element order). When the vector instruction has no endian bias, or when the endian bias of the vector instruction matches the specified endian preference, the compiler generates one or more instructions for the vector instruction as it normally does. When the endian bias of the vector instruction does not match the specified endian preference, the compiler generates instructions to fix the mismatch.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 8 is a diagram showing a sample snippet of code processed by a compiler;

FIG. 9 is a block diagram illustrating how a vector register is loaded assuming that the natural element order is big endian;

FIG. 10 is a diagram showing an instruction generated by the compiler for the vector splat instruction in FIG. 8 when the vector spat instruction has an endian bias that matches the big-endian natural element order;

FIG. 11 is a block diagram illustrating how a vector register is loaded assuming the natural element order is little endian; and FIG. 12 is a diagram showing an instruction generated by the compiler for the vector splat instruction in FIG. 8 when the vector splat instruction has an endian bias that does not match the little-endian natural element order.

DETAILED DESCRIPTION

Figure 1:
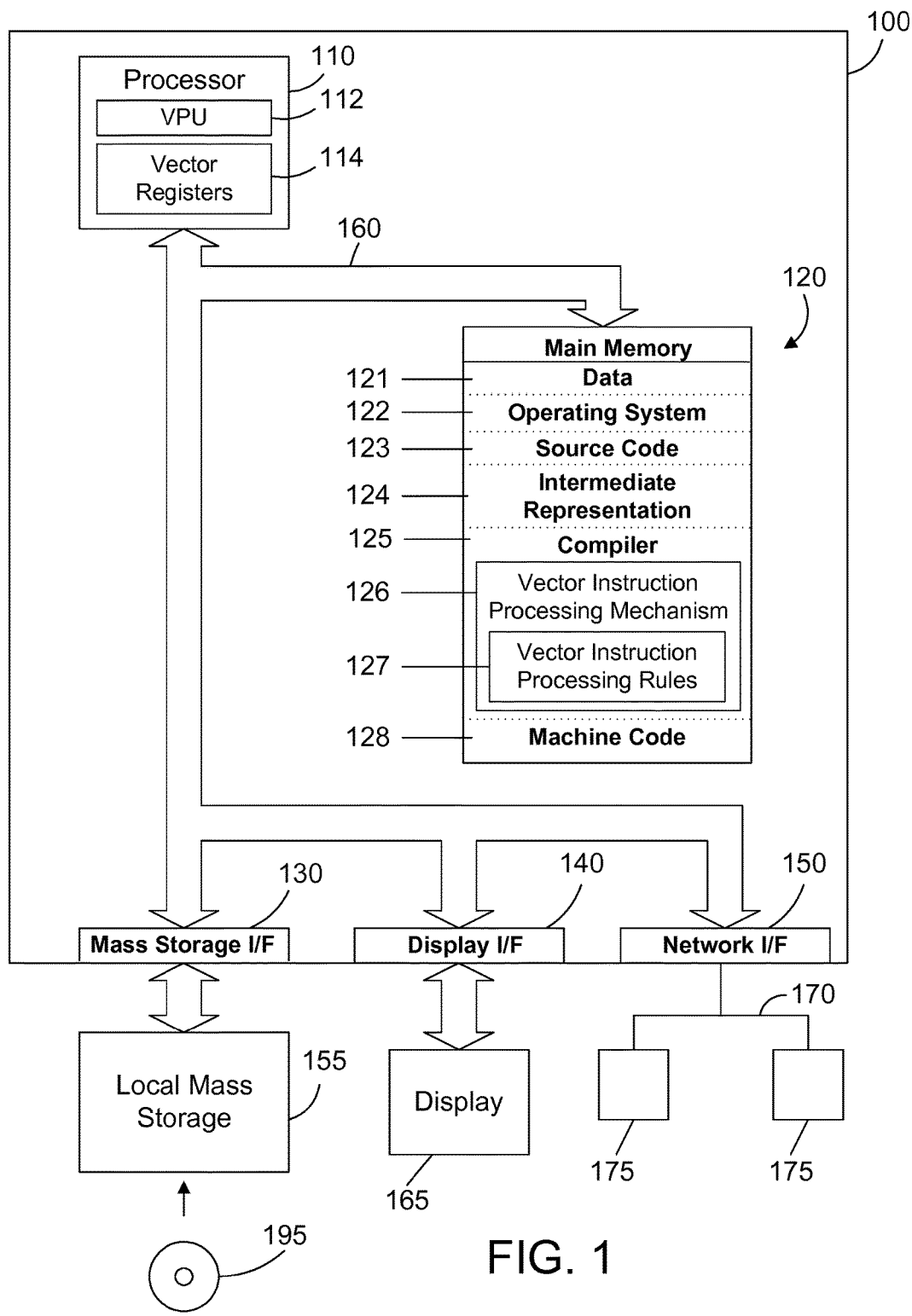
FIG. 1 is a block diagram of an apparatus that includes a vector instruction processing mechanism in a compiler.

Exploiting opportunities for parallel computation is very important for modern computing systems. One of the most common opportunities for parallel computation arises when the same operation is to be performed on an array (or "vector") of homogeneous data elements. Today's processor instruction set architectures (ISAs) usually include a set of single-instruction, multiple-data (SIMD) instructions that can operate on 2, 4, 8, 16, or 32 values simultaneously. SIMD instructions are examples of what are more broadly termed vector instructions as used herein. For example, the PowerPC ISA currently defines the Vector Add Floating-Point (vaddfp) instruction. This instruction operates on 128-bit vector registers, whose contents are interpreted as four 32-bit floating-point values. The corresponding values in each input register are added together and placed in the corresponding position in the output register. Thus four additions are performed using a single instruction.

Another aspect of today's processors is the concept of "endianness." This refers to how the processor stores bytes of a multi-byte value in memory. For example, a 64-bit integer in a machine register contains 8 bytes, arranged from most-significant byte (MSB) containing the bits representing the largest portions of the integer, to the least-significant byte (LSB) containing the bits representing the smallest portions of the integer. On a so-called Big Endian (BE) architecture, the same value is stored in memory with byte 0 containing the MSB, and byte 7 containing the LSB. On a so-called Little Endian (LE) architecture, the value is stored in memory with byte 0 containing the LSB, and byte 7 containing the MSB. These two methods arose for historical performance reasons that no longer matter a great deal, except that in today's world we must deal with these two incompatible views of memory.

BE and LE systems typically view values differently in vector registers as well. When an array of four 32-bit values is loaded into a 128-bit BE vector register, the zeroth element of the array occupies the most significant bytes, while the third element of the array (zero-based indexing) occupies the least significant bytes. When the same array is loaded into a 128-bit LE vector register, the zeroth element of the array occupies the least significant bytes, while the third element of the array occupies the most significant bytes. These are considered to be the "natural element order" for BE and LE memory models. The contents of each 4-byte element are represented in the same fashion on both BE and LE architectures, with the sign bit of the floating-point value placed in the most significant bit of the element.

Some ISAs (Power ISA and ARM, for example) are designed to operate either in Big Endian mode or in Little Endian mode. In the Power ISA, the endian mode is selected with a control bit in the machine state register (MSR). Thus the same instructions are available to carry out computation regardless of endianness. This is of no concern for instructions such as "vaddfp," described above, where the computation is performed uniformly on all elements of the instruction's input and output registers. However, when an instruction implicitly or explicitly refers to the element numbering within a vector register, the numbering that is natural for one endianness is unnatural for the other.

In some cases, an ISA may provide instructions to facilitate maintaining elements in vectors using a particular element order, regardless of the endian mode specified by the programmer. For example, the Load VSX Vector Doubleword*2 Indexed (lxvd2x) instruction in the Power ISA specifically loads elements into a vector register using the BE natural element order, whether or not the machine is using the BE memory model or the LE memory model. Similarly, the Store VSX Vector Doubleword*2 Indexed (stxvd2x) reverses this transformation, storing to memory as though the elements in the vector register use the BE natural element order. Using these instructions allows a programmer to ignore the actual endian memory model in use, for a subset of data types and instructions. Data within each element are formatted in memory based on the selected endian model, e.g., in accordance with the mode selected by MSR[LE].

An instruction that regards vector elements in vector registers using BE natural element order is said to have a BE vector element endian bias. Conversely, an instruction that regards vector elements in vector registers using LE natural element order is said to have an LE vector element endian bias. When the preponderance of vector instructions in an ISA have the same endian bias, this is referred to as the inherent endian bias of the ISA.

In bi-endian systems, there is typically a bit in the processor that specifies which endian mode the processor is running in. This disclosure applies when the processor endian mode is different than the inherent endian bias of the ISA.

Commonly, the programmer's desire is to have all instructions act as though registers contain vectors in the natural element order associated with the processor endian mode. Advantageously, this ensures order of array indices in a memory array to increase with element indices in vector registers. Also, processors only supporting a single mode—either LE or BE mode—usually select the endian bias so as to make the element order coincide with the processor's endian mode. Thus there is a need for a method to facilitate porting of code to always use the natural vector element order associated with the processor endian mode, regardless of the inherent endian bias of the ISA.

Figure 2:
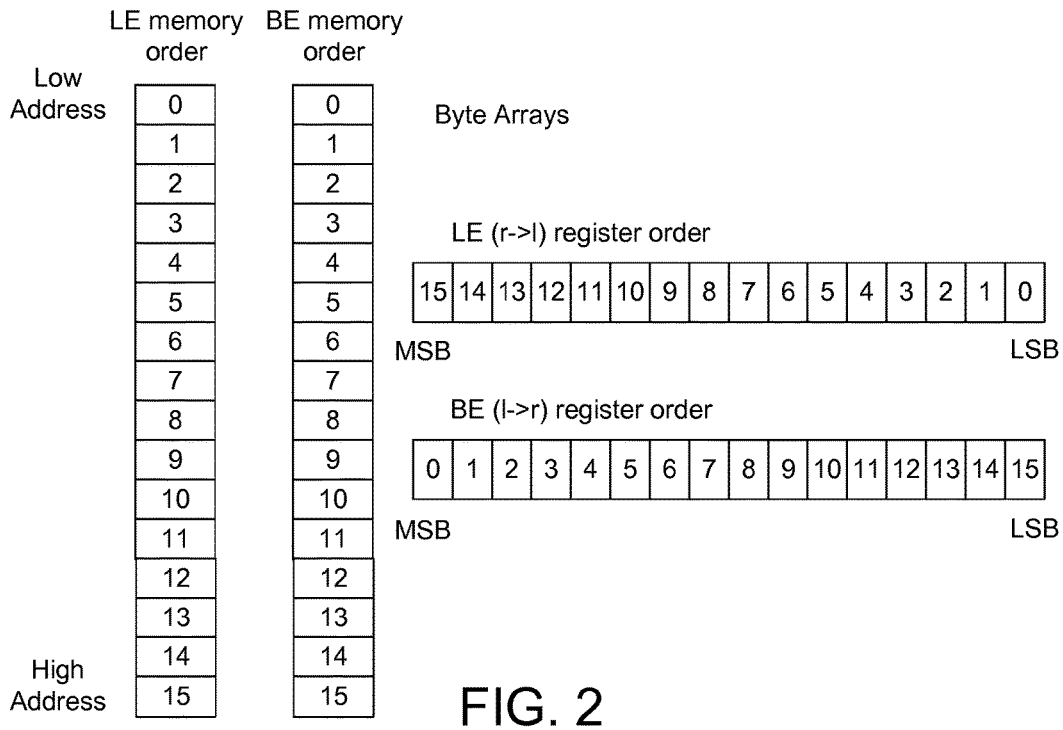
FIG. 2 is a block diagram illustrating how a byte array is stored in little endian and big endian systems.
Figure 3:
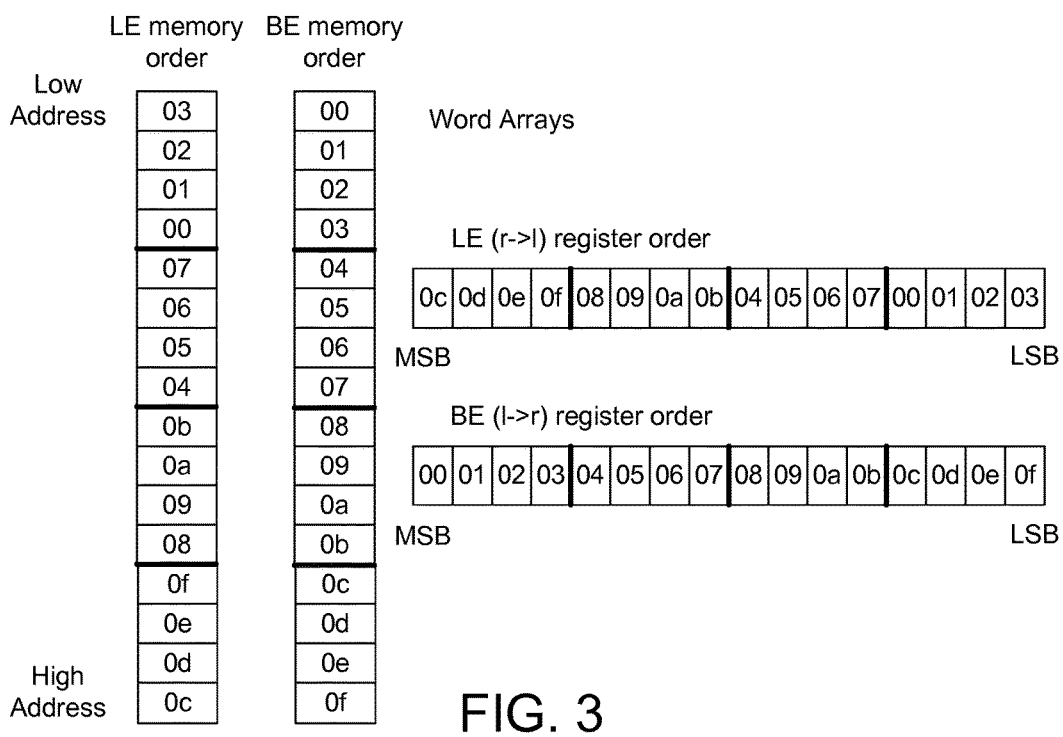
FIG. 3 is a block diagram illustrating how a word array is stored in little endian and big endian systems.

FIGS. 2 and 3 show examples of how data arrays may be represented in memory, using big-endian and little-endian data representation, and how they may be represented in vector registers, using l→r and r→l element ordering. In FIG. 2, an array of bytes containing {0, 1, ..., 15} is shown. Since each vector element is one byte long, the little-endian (LE) and big-endian (BE) representations in memory are identical, with the first element stored in the lowest address. Using r→l element ordering (LE), the first element is stored in the least significant byte (LSB) of the vector register; while using l→r element ordering (BE), the first element is stored in the most significant byte (MSB).

FIG. 3 shows representations for an array of 4-byte integers, containing {0x00010203, 0x04050607, 0x08090a0b, 0x0c0d0e0f}. In memory, elements appear in ascending address order for both BE and LE, but the byte order within each element differs. In registers, the opposite is true: the elements appear from right to left using r→l order (LE) and from left to right using l→r order (BE), but within each element the byte ordering is identical. Thus, we see the 4-byte integer stored in the least significant four bytes of the LE register are the same order, namely 00, 01, 02, 03 as the 4-byte integer stored in the most significant four bytes of the BE register. The order that changes is the order of elements, not the order of bytes within the elements.

A compiler as disclosed and claimed herein includes a vector instruction processing mechanism that generates instructions for vector instructions in a way that assures correct operation in a bi-endian environment, wherein the processor architecture contains instructions with an inherent endian bias. The compiler uses a code generation endian preference that is specified by the user, and that determines a natural element order. When the compiler processes a computer program, it generates instructions for vector operations by determining whether the vector instruction has an endian bias that matches the specified endian preference (i.e., the inherent element order of the vector instruction matches the natural element order). When the vector instruction has no endian bias, or when the endian bias of the vector instruction matches the specified endian preference, the compiler generates one or more instructions for the vector instruction as it normally does. When the endian bias of the vector instruction does not match the specified endian preference, the compiler generates instructions to fix the mismatch.

Referring to FIG. 1, a computer system 100 is one suitable implementation of a server computer system that includes a compiler with a vector instruction processing mechanism as described in more detail below. Server computer system 100 is an IBM POWER8 computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195.

Main memory 120 preferably contains data 121, an operating system 122, source code 123, an intermediate representation 124, a compiler 125, and machine code 128. Data 121 represents any data that serves as input to or output from any program in computer system 100. Operating system 122 is a multitasking operating system. There are three different representations of a computer program in FIG. 1, namely the high-level source code 123, the intermediate representation 124 that is generated by a front-end compiler from the source code 123, and the machine code 128 that is generated by a back-end compiler from the intermediate representation 124. The vector instruction processing mechanism 126 disclosed herein could be implemented within a front-end compiler, or different aspects of the vector instruction processing mechanism 126 could be implemented in both a front-end compiler and a back-end compiler. The compiler 125 thus could represent either a front-end compiler or a full compiler that includes a front-end and a back-end. The compiler 125 includes the vector instruction processing mechanism 126 that generates machine instructions for intermediate-representation vector instructions in a way that accounts for any mismatch between the endian bias of vector instructions when compared with the natural element order determined by the specified endian preference. When the endian bias of a vector instruction matches the natural element order, the instructions may be generated in a normal fashion as is done in the prior art. However, when the endian bias of a vector instruction does not match the natural element order, one or more instructions are generated to fix up the mismatch between the endian bias of the vector instruction and the natural element order.

Note the source code 123, intermediate representation 124, compiler 125, and machine code 128 are all shown residing in memory 120 for the convenience of showing all of these elements in one drawing. One skilled in the art will appreciate that this is not the normal mode of operation for most compilers. A front-end compiler processes source code 123 and generates therefrom intermediate representation 124. This processing may occur on a computer system separate from computer system 100. A back-end compiler processes intermediate representation 124 and generates therefrom machine code 128, which may also occur on a separate computer system. Compiler 125 could be a front-end compiler, or could be a compiler that includes both a front end and a back end. In the extreme, source code 123 could reside on a first computer system and a front-end compiler could reside on a second computer system. The front-end compiler could read the source code 123 from the first computer system, generate the intermediate representation 124, and store the intermediate representation 124 on a third computer system. A back-end compiler could be executed on a fourth computer system, which reads the intermediate representation 124 from the third computer system, and generates therefrom machine code 128, which could be written to a fifth computer system. This simple example shows that the preferred embodiments expressly extend to any suitable configuration and number of computer systems to accomplish the front-end and back-end compiling. The "apparatus" described herein and in the claims expressly extends to a multiple computer configuration, as described by the example above. In addition, the vector instruction processing mechanism 126 can include different portions implemented in different parts of the compiler.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, source code 123, intermediate representation 124, compiler 125, and machine code 128 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the compiler 125. Processor 110 preferably includes a vector processing unit (VPU) 112 and multiple vector registers 114. The VPU 112 and vector registers 114 allow the processor to execute Single Instruction Multiple Data (SIMD) instructions, which are examples of vector instructions discussed herein.

Although computer system 100 is shown to contain only a single processor and a single system bus, those skilled in the art will appreciate that a compiler as described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allows communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
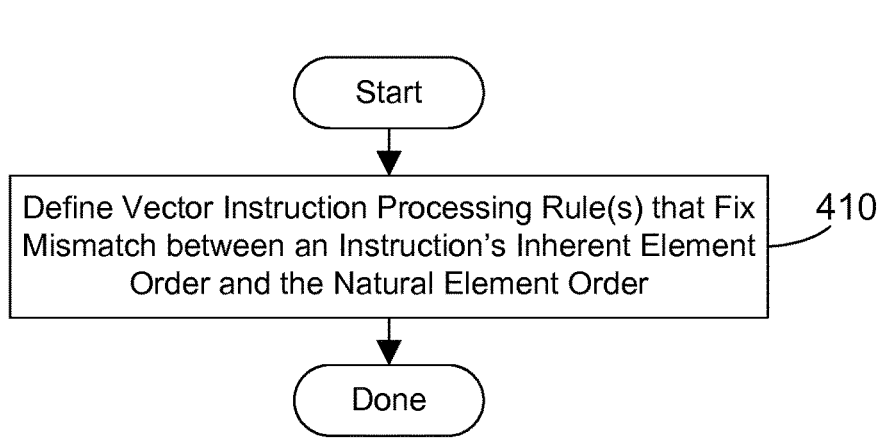
FIG. 4 is a flow diagram of a method for defining processing rules for vector instructions that fix a mismatch between an instruction's specified element order and the natural element order.
Figure 5:
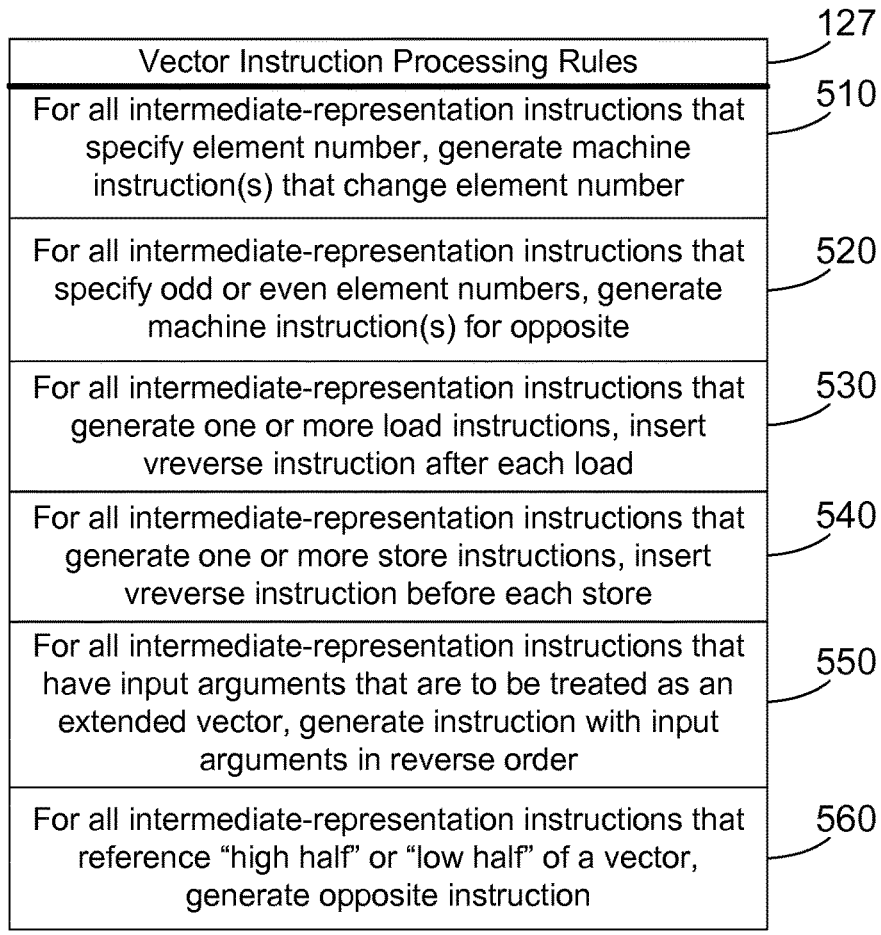
FIG. 5 is a diagram of a table that shows examples of the vector instruction processing rules shown in FIG. 1.

Referring to FIG. 4, method 400 defines one or more vector instruction processing rules that fix any mismatches between the endian bias of a vector instruction and the specified endian preference. This mismatch can also be stated as a mismatch between the instruction's inherent element order and the natural element order (step 410). Some examples of vector processing instruction rules 127 shown in FIG. 1 are shown in FIG. 5. For all intermediate-representation vector instructions that specify an element number, one or more machine instructions are generated that either contain a changed element number, or that first change the element number and then use that changed element number, as shown at 510. For all intermediate-representation vector instructions that specify odd or even element numbers, one or more machine instructions are generated that specify the opposite element numbers, as shown at 520. For all intermediate-representation instructions that generate one or more load instructions, a vector element reverse instruction is inserted after each load, as shown at 530. For all intermediate-representation instructions that generate one or more store instructions, a vector element reverse instruction is inserted before each store, as shown at 540. For all intermediate-representation instructions that have input arguments that are to be treated as an extended vector, instructions are generated with the input arguments in reverse order, as shown at 550. For all intermediate-representation instructions that reference "high half" or "low half" of a vector, the opposite instruction is generated, as shown at 560. Note the rules 127 in FIG. 5 apply only to vector instructions, and more specifically only apply to vector instructions that have a mismatch between the inherent element order of the instruction and the natural element order. Thus, some vector instructions may be processed in conjunction with one or more of rules 510-560 while others may be processed in accordance with the prior art. Further, multiple rules may be applied to some vector operations, e.g., a compiler may apply both rules 550 and 560 to transform a single vector operation to generate instructions. We assume all other non-vector instructions are processed by the compiler in accordance with known methods in the prior art. The vector instruction processing rules 127 shown in FIG. 5 are examples of processing rules when the inherent element order of the instruction does not match the natural element order, and do not necessarily constitute an exhaustive list.

Thus, in one aspect of an embodiment in accordance with the present invention, and in accordance with rule 510, when the specified preference for extracting an element does not match the inherent bias of that instruction, a compiler may implement a vector operation to extract element i from vector v such as vec_extract(v,i) in accordance with the specified preference by extracting the element n−1−i in accordance with a non-matching inherent bias of an extraction instruction or extraction sequence where n corresponds to the number of elements with respect to the data type being extracted. When the element number i is known at compile time, a compiler may directly insert a computed element index for the corresponding value. Thus, for example, when word element 3 is to be extracted from a PowerPC (Altivec or VSX) vector register with a specified little-endian preference in accordance with the Power ISA, this can be accomplished with an inherently big-endian-biased instruction to extract element 0. In another aspect of an embodiment, when the element number in accordance with a user-specified preference is not known at compile time, the compiler will be emitting code to convert an element number in accordance with a specified preference to one in accordance with an inherently biased instruction.

In another aspect of an embodiment in accordance with the present invention, and in accordance with rule 510, when the specified preference for inserting an element does not match the inherent bias of that instruction, a compiler may implement a vector operation to insert the value x into element i of vector v such as vec_insert(v,i,x) by inserting the element n−1−i where n corresponds to the number of elements with respect to the data type being extracted. When the element number i is known at compile time, a compiler may directly insert a computed element index for the corresponding value. Thus, for example, when word element 3 is to be inserted from a PowerPC (Altivec or VSX) vector register with a specified little-endian preference in accordance with the Power ISA, this can be accomplished with an inherently big-endian-biased instruction to insert into element 0. In another aspect of an embodiment, when the element number in accordance with a user-specified preference is not known at compile time, the compiler will be emitting code to convert an element number in accordance with a specified preference to one in accordance with an inherently biased instruction.

In another aspect of an embodiment in accordance with the present invention, and in accordance with rule 520, when the specified preference for multiplying the even vector elements of two vectors does not match the inherent bias of that instruction, a compiler may implement a vector operation to multiply the even elements with a vector instruction to multiply the odd elements using a multiply instruction with non-matching inherent bias.

Thus, a compiler may translate:
vector short a;
vector short b;
vector int c;
...
c=vec_mule(a,b);
as follows:
   vmulosh 2,2,3

In another aspect of an embodiment in accordance with the present invention, and in accordance with rule 520, when the specified preference for multiplying the odd vector elements of two vectors does not match the inherent bias of that instruction, a compiler may implement a vector operation to multiply the odd elements with a vector instruction to multiply the even elements using a multiply instruction with non-matching inherent bias.

Thus, a compiler may translate:
vector unsigned char a;
vector unsigned char b;
vector unsigned short c;
...
c=vec_mulo(a,b);
as follows:
   vmuleub 2,2,3

In another aspect of an embodiment in accordance with the present invention, and in accordance with rule 560, when the specified preference for merging the low vector elements of two vectors does not match the inherent bias of that instruction, a compiler may implement a vector operation to merge the low elements with a vector instruction to merge the high elements using a merge instruction with non-matching inherent bias.

Thus, a compiler may translate:
vector unsigned int a;
vector unsigned int b;
vector unsigned int c;
...
c=vec_mergel(a,b);
as follows:
   xxmrghw 34,34,35

In another aspect of an embodiment in accordance with the present invention, and in accordance with rule 560, when the specified preference for merging the high vector elements of two vectors does not match the inherent bias of that instruction, a compiler may implement a vector operation to merge the high elements with a vector instruction to merge the low elements using a merge instruction with non-matching inherent bias.

Thus, a compiler may translate:
vector unsigned char a;
vector unsigned char b;
vector unsigned char c;
...
c=vec_mergeh(a,b);
as follows:
   vmrglb 2,3,2

In another aspect of an embodiment in accordance with the present invention, and in accordance with rules 510 and 550, when the specified preference for performing a vector permute does not match the inherent bias of that instruction, a compiler may implement a vector operation to permute a concatenation of two vectors in accordance with a permute pattern stored in another vector of a specified preference with a vector permute instruction of a non-matching inherently biased vector permute instruction with reversed source operand order for the concatenated vectors in accordance with rule 550, after having converted byte element numbers of a permute pattern in accordance with rule 510.

Thus, a compiler may translate:
vector unsigned char a;
vector unsigned char b;
vector unsigned char pattern;
vector unsigned char c;
...
c=vec_perm(a,b,pattern)
as follows:
   vspltisb 0,−1
   vsububm 0,0,4
   vperm 2,3,2,0

In yet another code generation strategy, it may translate the code as follows by taking advantage of the equivalence of (255-i) and (NOT i)=NAND(i,i) for the low order bits:
   vnand 0,0,0
   vperm 2,3,2,0

While the specification herein describes the element adjustment as being computed relative to a vector length, which for the concatenated permute vector is 31 bytes, the implementations herein are using 255-i in lieu of 31-i, as 255 is easier to initialize and the results of both computations are equivalent in the low order 5 bits with the high order 3 bits being ignored in accordance with the vperm instruction of the Power ISA.

In preferred embodiments, instructions listed herein are in accordance with the instructions of the Power ISA and vector operations are further specified in accordance with vector builtin functions set forth by AltiVec Technology Programming Interface Manual and further including support for specifying element positions to include user-specified preference in accordance with the present invention.

Figure 6:
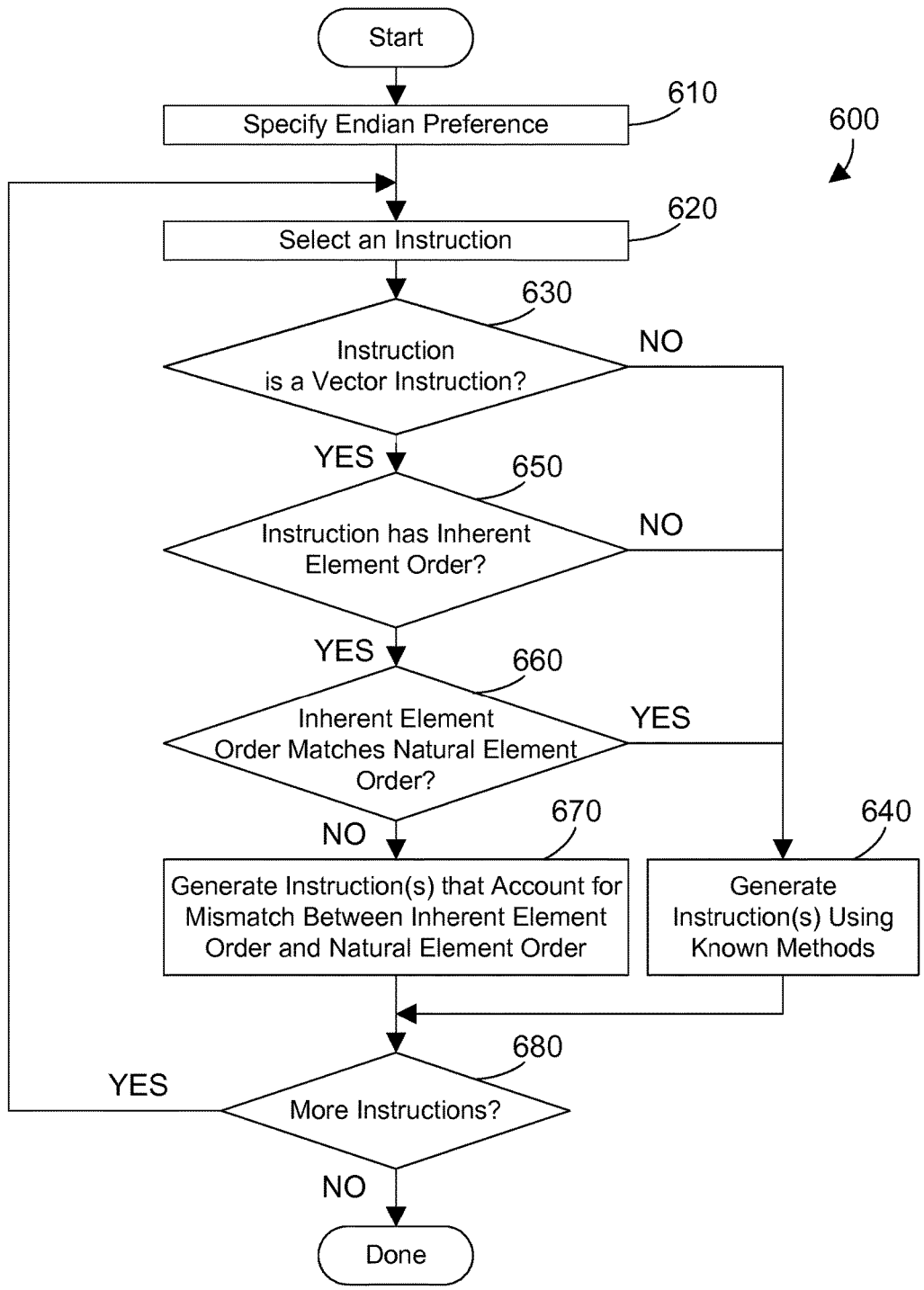
FIG. 6 is a flow diagram of a method for a compiler to process instructions based on a natural element order.

Referring to FIG. 6, a method 600 is preferably performed by the compiler 125 in FIG. 1. An endian preference is specified (step 610). The endian preference can be set by a user using a suitable endian preference selection mechanism, such as using a compiler option or switch. The endian preference specified in step 610 defines the natural element order for vector instructions that specify an element order. An instruction is selected (step 620). When the selected instruction is not a vector instruction (step 630=NO), one or more instructions are generated for the selected instruction using known methods (step 640). For this discussion, we assume that vector instructions include any instruction that reads from or writes to a vector register. Suitable examples of vector instructions include Single Instruction Multiple Data (SIMD) instructions. Because all other instructions that are not vector instructions do not operate on vector registers, the compiler can generate the corresponding instructions for these instructions as has been done in the prior art, which is represented in step 640 in FIG. 6.

When the selected instruction is a vector instruction (step 630=YES), but the instruction does not have an inherent element order (step 650=NO), the compiler generates instructions for the selected instruction using known methods (step 640). When the selected instruction has an inherent element order (step 650=YES), and when the inherent element order matches the natural element order (step 660=YES), the compiler generates instructions for the selected instruction using known methods (step 640). When the inherent element order of the selected instruction does not match the natural element order (step 660=NO), one or more instructions for the selected instruction are generated that fix the mismatch between the inherent element order of the instruction and the natural element order (step 670). How this is done depends on the type of vector instruction being processed, as described in more detail below with reference to FIG. 7. When there are more instructions to process (step 680=YES), method 600 loops back to step 620 and continues until there are no more instructions to process (step 680=NO), at which point method 600 is done.

Note that FIGS. 5 and 6 are discussed in terms of instructions that "generate" specific instructions. This is shorthand for indicating that the compiler, in generating machine instructions for the intermediate-representation instruction being processed, will generate other machine instructions for the intermediate-representation instruction. The instruction being processed by the compiler does not "generate" instructions, but this terminology is used as shorthand to indicate the compiler generates for these intermediate-representation instructions one or more machine code instructions.

Figure 7:
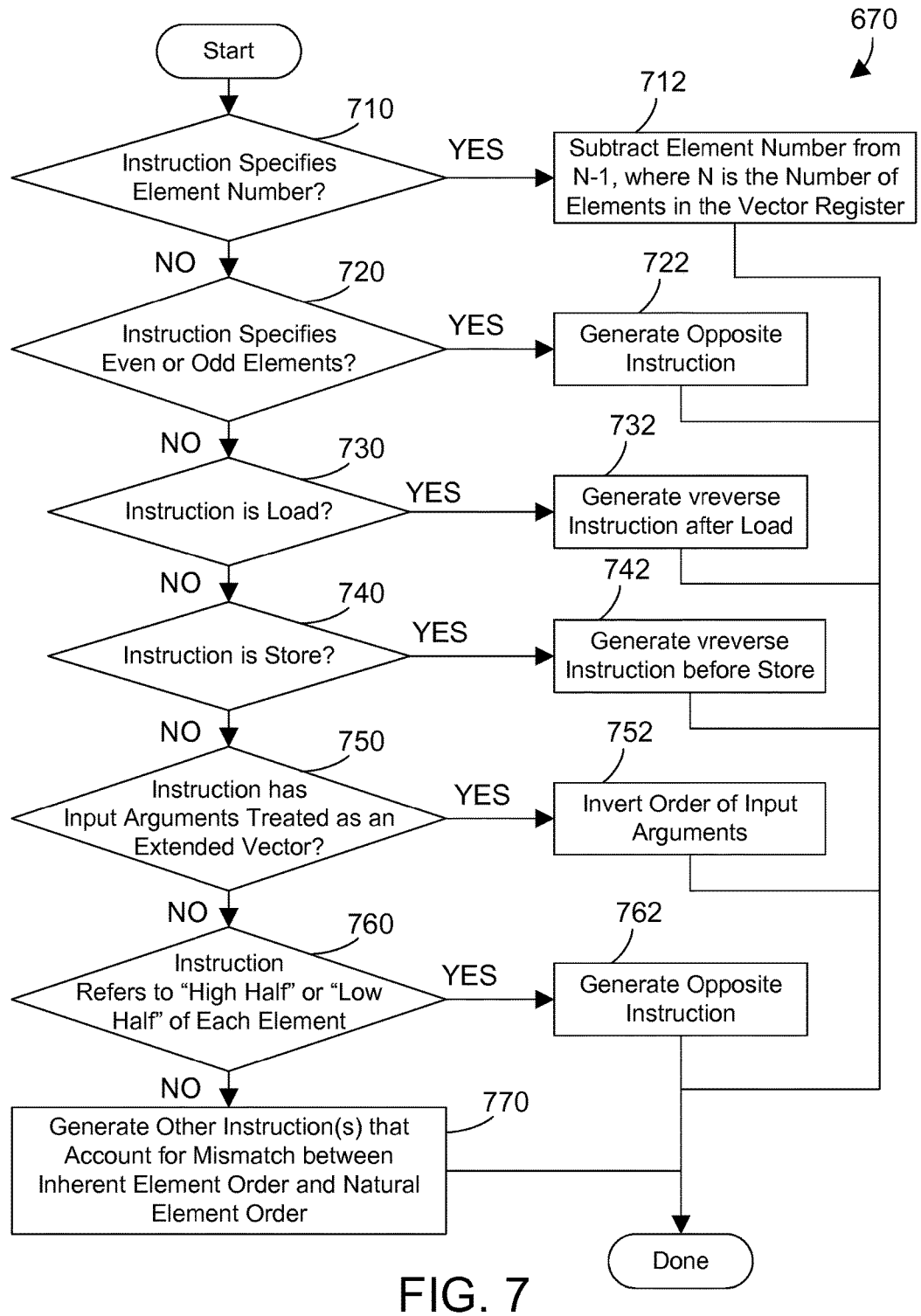
FIG. 7 is a flow diagram of one specific method for performing step 670 in FIG. 6 according to the vector instruction processing rules shown in FIG. 5.

Referring to FIG. 7, a method 670 represents one suitable implementation for step 670 shown in FIG. 6 within the scope of the disclosure and claims herein. When an instruction specifies an element number (step 710=YES), the specified element number is subtracted from N−1, where N is the number of elements in the vector register (step 712). For example, if the instruction specifies the third byte (element) of a sixteen byte vector, the instruction will be changed to specify instead the (16−1)−3, which is the twelfth byte in the vector register. This effectively fixes the mismatch between the specified element order of the instruction and the natural element order. When the instruction does not specify an element number (step 710=NO) but specifies even or odd elements (step 720=YES), the opposite instruction is generated (step 722). Thus, when an instruction specifies even elements, the equivalent instruction is generated in step 722 that specifies odd elements. Likewise, when the instruction specifies odd elements, the equivalent instruction is generated in step 722 that specifies even elements. This effectively fixes the mismatch between the specified element order of the instruction and the natural element order.

When the instruction does not specify even or odd elements (step 720=NO) but is a load (step 730=YES), a vector element reverse instruction is generated and inserted after the load (step 732). This effectively fixes the mismatch between the inherent element order of the instruction and the natural element order. When the instruction is not a load (step 730=NO) but is a store (step 740=YES), a vector element reverse instruction is generated and inserted before the store (step 742). This effectively fixes the mismatch between the inherent element order of the instruction and the natural element order. When the instruction is not a store (step 740=NO) but has input arguments treated as an extended vector (step 750=YES), an instruction is generated that inverts the order of the input arguments (step 752). This effectively fixes the mismatch between the inherent element order of the instruction and the natural element order. When the instruction does not have input arguments treated as an extended vector (step 750=NO), and when the instruction refers to a "high half" or "low half" of one or more vectors (step 760=YES), the opposite instruction is generated (step 762). Thus, for an instruction that refers to the "high half" of one or more vectors, an instruction is generated that refers to the "low half" of those vectors. Likewise, for an instruction that refers to a "low half" of one or more vectors, an instruction is generated that refers to the "high half" of those vectors. This effectively fixes the mismatch between the inherent element order of the instruction and the natural element order. Other instructions that do not satisfy the specified criteria in steps 710, 720, 730, 740, 750 and 760 can be processed in step 770 to account for the mismatch between the inherent element order and the natural element order. Step 770 broadly encompasses generating instructions for any type of vector instruction that has a mismatch between the instruction's inherent element order (endian bias) and the natural element order (specified endian preference), whether the vector instruction is currently known or developed in the future.

An example is now presented to illustrate some of the concepts discussed above with respect to FIGS. 6 and 7. This example is extremely simplified for the sake of illustration. A sample snippet of code is shown in FIG. 8, where a is defined as a vector unsigned char array of sixteen bytes. An instruction is defined at 810 that is a vector splat instruction that duplicates element 3 of a vector register into every element of another vector register. We assume for this example the selected endian preference is big endian, and that the endian bias of the vector splat instruction is also big endian. We assume vector register five (v5) is loaded as shown in FIG. 9. Since the endian bias of the instruction matches the specified endian preference (i.e., since the inherent element order of the instruction matches the natural element order), the instruction can be generated by the compiler directly as done in the prior art, as shown in FIG. 10. FIG. 11 shows how the vector register v5 is loaded when the selected endian preference is little endian. Note that the order of the bytes is reversed, as shown in FIG. 9 (compare also FIG. 2). Thus, if a vector splat instruction were generated that referenced element 3, the instruction would reference the wrong data. To fix the mismatch between the instruction's endian bias and the specified endian preference (i.e., between the inherent element order and the natural element order), the number in the instruction is subtracted from N−1, where N is the number of elements in the vector register. For the specific example in FIG. 8, the vector array is an array of sixteen bytes, so the reference number for the new instruction generated by the compiler is (16−1)−3=12. Referring to FIG. 12, a vector splat instruction is generated by the compiler that references byte 12 instead of byte 3, which fixes the mismatch between the inherent endian bias of the instruction and the specified endian preference.

FIGS. 8, 11 and 12 illustrate a specific example for how the compiler generates an instruction in accordance with step 712 in FIG. 7. While detailed examples are not provided herein for steps 722, 732, 742, 752 and 762 in FIG. 7, one of ordinary skill in the art will understand based on these steps in FIG. 7 how the compiler discussed and claimed herein can generate instructions that account for a mismatch between the inherent element order of a vector instruction and the natural element order. The disclosure and claims herein expressly extend to a compiler that generates any instruction or number of instructions that fix a mismatch between an inherent element order of a vector instruction and the natural element order determined by a specified endian preference.

When there is a mismatch between the endian bias of the instruction being processed and the specified endian preference, the compiler must generate code that accounts for this mismatch. Referring to FIG. 7, steps 732 and 742 generate vector element reverse instructions, denoted in FIG. 7 as vreverse instructions. Note that different vector element reverse instructions are needed depending on the size of the elements in the vector register. For a byte array, as shown at v5 in FIGS. 9 and 11, a byte vector element reverse instruction will reverse the order of all the bytes. Thus, when the order in the v5 register is as shown in FIG. 9, the resulting order in the v5 register after executing the byte vector element reverse instruction will be as shown in FIG. 11. When the order in the v5 register is as shown in FIG. 11, the resulting order in the v5 register after executing the byte vector element reverse instruction will be as shown in FIG. 9. Note, however, that simply changing the order of all the bytes will produce an incorrect result in the case of arrays of other sizes. This demonstrates the need for, e.g., a different halfword vector element reverse instruction that will treat halfwords as the element of interest and swap halfwords to arrive at the correct configuration. Each different type of vector element reverse instruction thus operates on a different element size as discussed in detail above. Where there is no vector element reverse instruction for a particular element size, it can be synthesized out of a general permute or shuffle instruction, but that may be less efficient than a specific instruction. The different vector element reverse instructions may operate on data in any suitable size, including bytes, words, halfwords, words, double-words, quadwords, and elements larger than quadwords.

The ability for a compiler to effectively and efficiently account for any mismatch between inherent endian bias in the instruction and specified endian preference of the system allows the compiler disclosed and claimed herein to easily port code written for Big Endian to a target system that is Little Endian, and vice versa. The only previously known method for fixing such a mismatch is for the programmer to manually locate and change all instructions that have the mismatch, which is a very inefficient, manual and timeconsuming process. The compiler disclosed herein makes all of this effort by the programmer unnecessary because the mismatch can be accounted for by strategically generating instructions that account for the mismatch as disclosed herein.

The claims and disclosure herein provide a compiler that includes a vector instruction processing mechanism that generates instructions for vector instructions in a way that assures correct operation in a bi-endian environment, wherein the processor architecture contains instructions with an inherent endian bias. The compiler uses a code generation endian preference that is specified by the user, and that determines a natural element order. When the compiler processes a computer program, it generates instructions for vector operations by determining whether the vector instruction has an endian bias that matches the specified endian preference (i.e., the inherent element order of the vector instruction matches the natural element order). When the vector instruction has no endian bias, or when the endian bias of the vector instruction matches the specified endian preference, the compiler generates one or more instructions for the vector instruction as it normally does. When the endian bias of the vector instruction does not match the specified endian preference, the compiler generates instructions to fix the mismatch.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method executed by at least one processor for a compiler to process a plurality of instructions in a computer program, the method comprising:
   the compiler reading the plurality of instructions;
   the compiler determining an endian preference that defines a natural element order for vector instructions in the plurality of instructions; and
   the compiler determining when a vector instruction in the plurality of instructions has an inherent element order that is a mismatch to the natural element order, and in response, generating at least one instruction to fix the mismatch.

2. The method of claim 1 further comprising determining when the vector instruction specifies a first element number, and in response, generating an instruction that references a second element number computed by subtracting the first element number from a number of elements in the vector minus one.

3. The method of claim 1 further comprising determining when the vector instruction specifies odd elements, and in response, generating an instruction that specifies even elements, and determining when the vector instruction specifies even elements, and in response, generating an instruction that specifies odd elements.

4. The method of claim 1 further comprising determining when the vector instruction is a vector load instruction, and in response, generating a vector element reverse instruction after the vector load instruction.

5. The method of claim 1 further comprising determining when the vector instruction is a vector store instruction, and in response, generating a vector element reverse instruction before the vector store instruction.

6. The method of claim 4 wherein each vector element reverse instruction reverses order of a plurality of elements of a vector register.

7. The method of claim 6 wherein the plurality of elements of the vector register comprises one of:
   a plurality of bytes;
   a plurality of halfwords;
   a plurality of words;
   a plurality of double-words;
   a plurality of quadwords; and
   a plurality of elements larger than quadwords.

8. The method of claim 1 further comprising determining when the vector instruction is an instruction that has input arguments treated as an extended vector, and in response, generating a vector instruction with an inverted order of the input arguments.

9. The method of claim 1 further comprising determining when the vector instruction refers to a high half of at least one vector register, and in response, generating an instruction that refers to a low half of the at least one vector register, and determining when the vector instruction refers to a low half of at least one vector register, and in response, generating an instruction that refers to the high half of the at least one vector register.

10. A computer-implemented method executed by at least one processor for a compiler to process a plurality of instructions in a computer program, the method comprising the steps of:
    determining an endian preference that defines a natural element order for vector instructions in the plurality of instructions;
    selecting a vector instruction in the plurality of instructions;
    when the selected vector instruction has an inherent element order that does not match the natural element order:
      determining when the vector instruction specifies a first element number, and in response, generating an instruction that references a second element number computed by subtracting the first element number from a number of elements in the vector minus one;
      determining when the vector instruction specifies odd elements, and in response, generating an instruction that specifies even elements;
      determining when the vector instruction specifies even elements, and in response, generating an instruction that specifies odd elements;
      determining when the vector instruction is a vector load instruction, and in response, generating a vector element reverse instruction after the vector load instruction;
      determining when the vector instruction is a vector store instruction, and in response, generating a vector element reverse instruction before the vector store instruction;
      wherein each vector element reverse instruction reverses order of a plurality of elements of a vector register, wherein the plurality of elements of the vector register comprises one of:
      a plurality of bytes;
      a plurality of halfwords;
      a plurality of words; and
      a plurality of double-words;
      determining when the vector instruction is an instruction that has input arguments treated as an extended vector, and in response, generating a vector instruction with an inverted order of the input arguments;
      determining when the vector instruction refers to a high half of at least one vector register, and in response, generating an instruction that refers to a low half of the at least one vector register; and determining when the vector instruction refers to the low half of at least one vector register, and in response, generating an instruction that refers to the high half of the at least one vector register.

\* \* \* \* \*